United States Patent
Fu et al.

(10) Patent No.: US 9,356,707 B2
(45) Date of Patent: May 31, 2016

(54) METHOD TO TRIGGER IN-DEVICE COEXISTENCE INTERFERENCE MITIGATION IN MOBILE CELLULAR SYSTEMS

(71) Applicant: MEDIATEK INC., Hsinchu (TW)

(72) Inventors: I-Kang Fu, Taipei (TW); William Plumb, Charlestown, MA (US)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/263,166

(22) Filed: Apr. 28, 2014

(65) Prior Publication Data

US 2014/0235175 A1 Aug. 21, 2014

Related U.S. Application Data

(63) Continuation of application No. 13/136,862, filed on Aug. 11, 2011, now Pat. No. 8,737,924.

(60) Provisional application No. 61/373,142, filed on Aug. 12, 2010, provisional application No. 61/373,151, filed on Aug. 12, 2010, provisional application No. 61/374,046, filed on Aug. 16, 2010, provisional application No. 61/374,052, filed on Aug. 16, 2010.

(51) Int. Cl.
*H04B 15/00* (2006.01)
*H04B 1/10* (2006.01)
(Continued)

(52) U.S. Cl.
CPC ............ *H04B 15/00* (2013.01); *H04B 1/1027* (2013.01); *H04B 1/406* (2013.01); *H04B 1/48* (2013.01);
(Continued)

(58) Field of Classification Search
CPC ........ H04B 15/00; H04B 1/406; H04B 1/525; H04B 1/1027; H04W 52/244
USPC ................................................. 455/63.1, 296
See application file for complete search history.

(56) References Cited

U.S. PATENT DOCUMENTS 7,634,232 B2 12/2009 Waxman ...................... 455/63.1
7,809,012 B2 10/2010 Ruuska et al. ................ 370/449
(Continued)

FOREIGN PATENT DOCUMENTS

CN 1731692 A 2/2006
CN 101132368 A 2/2008
(Continued)

OTHER PUBLICATIONS

EPO, Search Report for the EP application 11795201.0 dated Dec. 18, 2014 (8 pages).
EPO, Search Report for the EP application 11816122.3 dated Oct. 21, 2014 (8 pages).
(Continued)

*Primary Examiner* — Gennadiy Tsvey
(74) *Attorney, Agent, or Firm* — Imperium Patent Works; Zheng Jin (57) ABSTRACT

A method to trigger in-device coexistence (IDC) interference mitigation is provided. A wireless device comprises a first radio module and a co-located second radio module. The first radio module measures a received radio signal based on a plurality of sampling instances. A control entity obtains Tx/Rx activity of the second radio module and informs Tx/Rx timing information to the first radio module. The first radio module determines a measurement result based on the obtained timing information. The first radio module triggers an IDC interference mitigation mechanism if the measurement result satisfies a configurable condition. In one embodiment, the first radio module reports IDC interference information and traffic pattern information of the second radio module to a base station for network-assisted coexistence interference mitigation. The IDC triggering mechanism prevents unnecessary and arbitrary IDC request from the device and thus improves network efficiency.

20 Claims, 8 Drawing Sheets (51) Int. Cl.
*H04B 1/403* (2015.01)
*H04B 1/525* (2015.01)
*H04W 52/24* (2009.01)
*H04B 1/48* (2006.01)
*H04W 4/00* (2009.01)
*H04W 72/04* (2009.01)
*H04W 76/04* (2009.01)
*H04W 88/06* (2009.01)

(52) U.S. Cl.
CPC .............. *H04B 1/525* (2013.01); *H04W 4/008* (2013.01); *H04W 52/244* (2013.01); *H04W 72/0473* (2013.01); *H04W 76/048* (2013.01); *H04W 88/06* (2013.01); *H04B 2001/485* (2013.01)

(56) References Cited

U.S. PATENT DOCUMENTS

| | | | |
|---|---|---|---|
| 8,345,652 B2 | 1/2013 | Banerjea et al. | 370/338 |
| 2004/0224719 A1 | 11/2004 | Nounin et al. | 455/553.1 |
| 2005/0059347 A1 | 3/2005 | Haartsen | 455/41.2 |
| 2006/0217071 A1 | 9/2006 | Russo et al. | 455/66.1 |
| 2007/0021066 A1 | 1/2007 | Dravida et al. | 455/41.2 |
| 2007/0165754 A1 | 7/2007 | Kiukkonen et al. | 375/346 |
| 2007/0263709 A1 | 11/2007 | Kasslin et al. | 375/222 |
| 2008/0043705 A1 | 2/2008 | Desai et al. | 370/346 |
| 2008/0075059 A1 | 3/2008 | Kermoal et al. | 370/343 |
| 2008/0080555 A1 | 4/2008 | Carter et al. | 370/470 |
| 2008/0200195 A1 | 8/2008 | Abe et al. | 455/501 |
| 2008/0253352 A1 | 10/2008 | Thoukydides et al. | 370/345 |
| 2009/0017756 A1 | 1/2009 | Tsfaty et al. | 455/41.2 |
| 2009/0028115 A1 | 1/2009 | Hirsch | 370/337 |
| 2009/0040937 A1 | 2/2009 | Xhafa et al. | 370/252 |
| 2009/0054009 A1 | 2/2009 | Yang et al. | 455/78 |
| 2009/0081962 A1 | 3/2009 | Sohrabi | 455/79 |
| 2009/0088177 A1 | 4/2009 | Yang et al. | 455/452.2 |
| 2009/0168716 A1 | 7/2009 | Moon et al. | 370/329 |
| 2009/0225717 A1 | 9/2009 | Banerjea | 370/329 |
| 2009/0247218 A1 | 10/2009 | Lee et al. | 455/553.1 |
| 2009/0252122 A1 | 10/2009 | Leinonen et al. | 370/332 |
| 2009/0257208 A1 | 10/2009 | Filipovic et al. | 361/760 |
| 2009/0262785 A1 | 10/2009 | Wilhelmsson | 375/133 |
| 2009/0298440 A1 | 12/2009 | Takeya et al. | 455/67.14 |
| 2009/0322596 A1 | 12/2009 | Rowitch et al. | 342/357.1 |
| 2010/0008336 A1 | 1/2010 | Keidar et al. | 370/338 |
| 2010/0027525 A1 | 2/2010 | Zhu | 370/350 |
| 2010/0046498 A1 | 2/2010 | Hall | 370/350 |
| 2010/0054207 A1 | 3/2010 | Gupta et al. | 370/331 |
| 2010/0061326 A1 | 3/2010 | Lee et al. | 370/329 |
| 2010/0098135 A1 | 4/2010 | Eitan | 375/141 |
| 2010/0137025 A1 | 6/2010 | Tal et al. | 455/553.1 |
| 2010/0191613 A1 | 7/2010 | Raleigh | 705/26 |
| 2010/0197235 A1 | 8/2010 | Wilhelmsson | 455/63.3 |
| 2010/0227639 A1 | 9/2010 | Kim et al. | 455/525 |
| 2011/0136497 A1 | 6/2011 | Youtz et al. | 455/452.2 |
| 2011/0149920 A1* | 6/2011 | Liu et al. | 370/336 |
| 2011/0235612 A1 | 9/2011 | Abeta et al. | 370/329 |
| 2011/0235621 A1 | 9/2011 | Ko et al. | 370/338 |
| 2011/0243047 A1 | 10/2011 | Dayal et al. | 370/311 |
| 2011/0256834 A1 | 10/2011 | Dayal et al. | 455/67.7 |
| 2012/0020229 A1 | 1/2012 | Dayal et al. | 370/252 |
| 2012/0113884 A1 | 5/2012 | Park et al. | 370/312 |
| 2012/0218964 A1 | 8/2012 | Park et al. | 370/329 |
| 2012/0230252 A1 | 9/2012 | Yang | 370/328 |
| 2012/0269172 A1 | 10/2012 | Chin et al. | 370/332 |

FOREIGN PATENT DOCUMENTS

| | | | |
|---|---|---|---|
| CN | 101141155 A | 3/2008 |
| CN | 101361279 A | 2/2009 |
| CN | 101365249 A | 2/2009 |
| CN | 101431808 A | 5/2009 |
| CN | 101553054 A | 10/2009 |
| CN | 101640565 A | 2/2010 |
| CN | 101677290 A | 3/2010 |
| CN | 101742526 A | 6/2010 |
| CN | 101848058 A | 9/2010 |
| EP | WO2010054364 A1 | 11/2008 |
| EP | 2107839 | 10/2009 |
| JP | 2001128237 | 5/2001 |
| JP | 2006279943 | 10/2006 |
| JP | 2008235978 | 10/2008 |
| JP | 2009500988 | 1/2009 |
| JP | 200965307 | 3/2009 |
| JP | 2009512244 | 3/2009 |
| JP | 2010038348 | 2/2010 |
| WO | WO2005020518 A1 | 3/2005 |
| WO | WO2005117473 | 12/2005 |
| WO | WO2007036686 | 4/2007 |
| WO | WO2007143352 | 12/2007 |
| WO | WO2008078311 | 7/2008 |
| WO | WO2009127690 | 10/2009 |
| WO | WO2010002219 A2 | 1/2010 |
| WO | WO2010025678 | 3/2010 |
| WO | WO2010027208 | 3/2010 |
| WO | WO2010073325 | 7/2010 |

OTHER PUBLICATIONS

"Information technology—Telecommunications and information exchange between systems—Local and Metropolitan area networks—Specific requirements—Part 11: Wireless LAN Medium Access Control (MAC) and Physical Layer (PHY) Specifications", (Jan. 1, 2003), IEEE Standard; [IEEE Standard], IEEE, Piscataway, NJ, USA, pp. 3-8, pp. 72-73.
International Search Report and Written Opinion of International Search Authority for PCT/CN2011/075963 dated Sep. 8, 2011 (11 pages).
International Search Report and Written Opinion of International Search Authority for PCT/CN2011/078368 dated Nov. 3, 2011 (13 pages).
3GPP TSG-RAN WG2 Meeting#70bis R2-103644; MediaTek; Discussion on In-Device Coexistence Interference Avoidance; Stockholm, Sweden; Jun. 28-Jul. 2, 2010 (3 pages).
International Search Report and Written Opinion of International Search Authority for PCT/CN2011/078377 dated Nov. 17, 2011 (11 pages).
International Search Report and Written Opinion of International Search Authority for PCT/CN2011/081042 dated Feb. 2, 2012 (10 pages).
International Search Report and Written Opinion of International Search Authority for PCT/CN2011/080479 dated Jan. 19, 2012 (12 pages).
The EPO has prepared the Search Report for the EP patent application 11833858 dated Apr. 24, 2013 (13 pages).
JP Office Action for JP applicant 2013-514543 dated Jan. 28, 2014 (7 pages).
JP Office Action for JP applicant 2013-534155 dated Feb. 4, 2014 (2 pages).
JP Office Action for JP applicant 2013-523483 dated Feb. 18, 2014 (4 pages).
JP Office Action for JP applicant 2013-530554 dated Mar. 14, 2014 (4 pages).
JPO Office Action of JP patent application 2013-520958 dated Mar. 4, 2014 (4 pages).
JPO Office Action of JP patent application 2013-530554 dated Apr. 1, 2014 (4 pages).
USPTO Office Action of related U.S. Appl. No. 13/136,861 dated Aug. 23, 2014 (12 pages).
EPO, Search Report for the EP application 11828151.8 dated Feb. 9, 2015 (9 pages).
R2-103644, 3GPP TSG-RAN WG2 Meeting #70bis; MediaTek; Discussion on In-Device Coexistence Interference Avoidance; Jun. 28-Jul. 2, 2010 (3 pages).
USPTO, Office Action for related U.S. Appl. No. 13/136,861 dated Mar. 31, 2015 (16 pages).
USPTO, Office Action for related U.S. Appl. No. 14/200,398 dated Apr. 7, 2015 (11 pages).
USPTO, Office Action for related U.S. Appl. No. 14/967,565 dated Jan. 29, 2016 (14 pages).

\* cited by examiner (Prior Art)
FIG. 1

METHOD TO TRIGGER IN-DEVICE COEXISTENCE INTERFERENCE MITIGATION IN MOBILE CELLULAR SYSTEMS

CROSS REFERENCE TO RELATED APPLICATIONS

This application is a continuation, and claims priority under 35 U.S.C. §120 from nonprovisional U.S. patent application Ser. No. 13/136,862, entitled "Method to Trigger In-Device Coexistence Interference Mitigation in Mobile Cellular Systems," filed on Aug. 11, 2011, the subject matter of which is incorporated herein by reference. Application Ser. No. 13/136,862, in turn, claims priority under 35 U.S.C. §119 from U.S. Provisional Application No. 61/373,142, entitled "Method to Trigger In-Device Coexistence Interference Mitigation in Mobile Cellular Systems," filed on Aug. 12, 2010; U.S. Provisional Application No. 61/373,151, entitled "Method of In-Device Interference Mitigation for Cellular, Bluetooth, WiFi and Satellite Systems Coexistence," filed on Aug. 12, 2010; U.S. Provisional Application No. 61/374,046, entitled "Method of In-Device Interference Mitigation for Wireless Systems," filed on Aug. 16, 2010; U.S. Provisional Application No. 61/374,052, entitled "Method of In-Device Interference Avoidance for wireless Systems," filed on Aug. 16, 2010, the subject matter of which is incorporated herein by reference.

TECHNICAL FIELD

The disclosed embodiments relate generally to wireless network communications, and, more particularly, to method of triggering in-device coexistence interference mitigation.

BACKGROUND

Ubiquitous network access has been almost realized today. From network infrastructure point of view, different networks belong to different layers (e.g., distribution layer, cellular layer, hot spot layer, personal network layer, and fixed/wired layer) that provide different levels of coverage and connectivity to users. Because the coverage of a specific network may not be available everywhere, and because different networks may be optimized for different services, it is thus desirable that user devices support multiple radio access networks on the same device platform. As the demand for wireless communication continues to increase, wireless communication devices such as cellular telephones, personal digital assistants (PDAs), smart handheld devices, laptop computers, tablet computers, etc., are increasingly being equipped with multiple radio transceivers. A multiple radio terminal (MRT) may simultaneously include a Long-Term Evolution (LTE) or LTE-Advanced (LTE-A) radio, a Wireless Local Area Network (WLAN, e.g., WiFi) access radio, a Bluetooth (BT) radio, and a Global Navigation Satellite System (GNSS) radio.

Due to spectrum regulation, different technologies may operate in overlapping or adjacent radio spectrums. For example, LTE/LTE-A TDD mode often operates at 2.3-2.4 GHz, WiFi often operates at 2.400-2.483.5 GHz, and BT often operates at 2.402-2.480 GHz. Simultaneous operation of multiple radios co-located on the same physical device, therefore, can suffer significant degradation including significant coexistence interference between them because of the overlapping or adjacent radio spectrums. Due to physical proximity and radio power leakage, when the transmission of data for a first radio transceiver overlaps with the reception of data for a second radio transceiver in time domain, the second radio transceiver reception can suffer due to interference from the first radio transceiver transmission. Likewise, data transmission of the second radio transceiver can interfere with data reception of the first radio transceiver.

Figure 1:
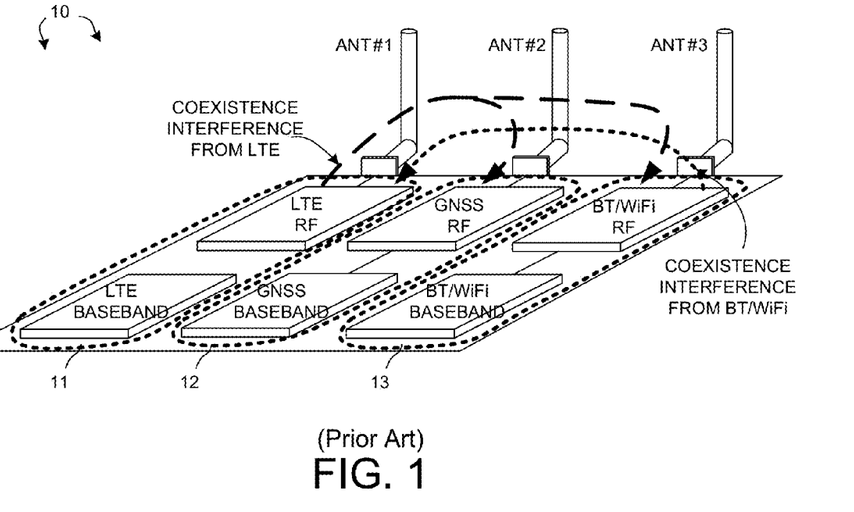
FIG. 1 (Prior Art) is a diagram that illustrates interference between an LTE transceiver and a co-located WiFi/BT transceiver and GNSS receiver.

FIG. 1 (Prior Art) is a diagram that illustrates interference between an LTE transceiver and a co-located WiFi/BT transceiver and GNSS receiver. In the example of FIG. 1, user equipment (UE) 10 is an MRT comprising an LTE transceiver 11, a GNSS receiver 12, and a BT/WiFi transceiver 13 co-located on the same device platform. LTE transceiver 11 comprises an LTE baseband module and an LTE RF module coupled to an antenna #1. GNSS receiver 12 comprises a GNSS baseband module and a GNSS RF module coupled to antenna #2. BT/WiFi transceiver 13 comprises a BT/WiFi baseband module and a BT/WiFi RF module coupled to antenna #3. When LTE transceiver 11 transmits radio signals, both GNSS receiver 12 and BT/WiFi transceiver 13 may suffer coexistence interference from LTE. Similarly, when BT/WiFi transceiver 13 transmits radio signals, both GNSS receiver 12 and LTE transceiver 11 may suffer coexistence interference from BT/WiFi. How UE10 can simultaneously communicate with multiple networks through different transceivers and avoid/reduce coexistence interference is a challenging problem.

Figure 2:
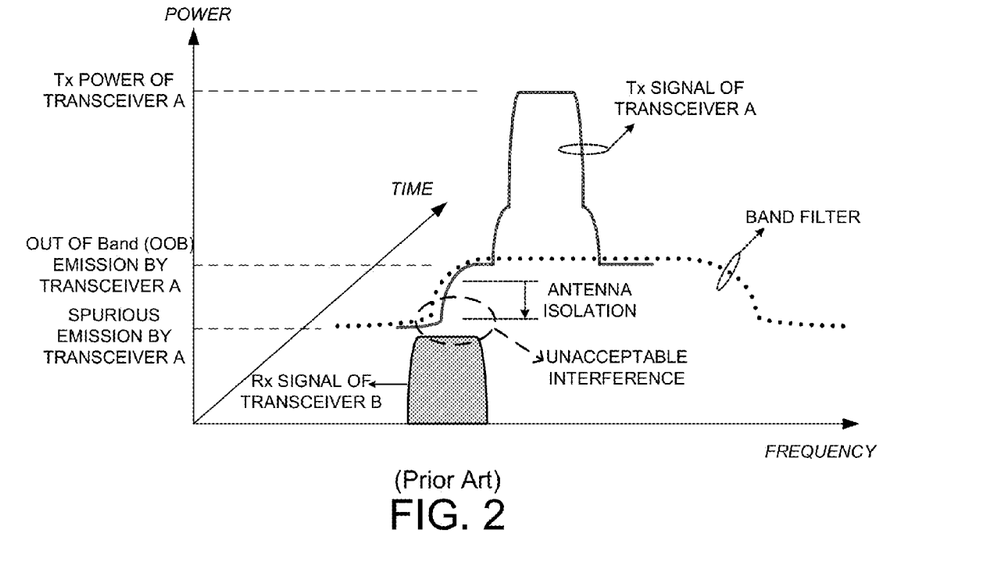
FIG. 2 (Prior Art) is a diagram that illustrates the signal power of radio signals from two co-located RF transceivers in a same device platform.

FIG. 2 (Prior Art) is a diagram that illustrates the signal power of radio signals from two co-located RF transceivers. In the example of FIG. 2, transceiver A and transceiver B are co-located in the same device platform (i.e., in-device). The transmit (TX) signal by transceiver A (e.g., WiFi TX in ISM CH1) is very close to the receive (RX) signal (e.g., LTE RX in Band 40) for transceiver B in frequency domain. The out of band (OOB) emission and spurious emission resulted by imperfect TX filter and RF design of transceiver A may be unacceptable to transceiver B. For example, the TX signal power level by transceiver A may be still higher (e.g. 60 dB higher before filtering) than RX signal power level for transceiver B even after the filtering (e.g., after 50 dB suppression).

In addition to imperfect TX filter and RF design, imperfect RX filter and RF design may also cause unacceptable in-device coexistence interference. For example, some RF components may be saturated due to transmit power from another in-device transceiver but cannot be completely filtered out, which results in low noise amplifier (LNA) saturation and cause analog to digital converter (ADC) to work incorrectly. Such problem actually exists regardless of how much the frequency separation between the TX channel and the RX channel is. This is because certain level of TX power (e.g., from a harmonic TX signal) may be coupled into the RX RF frontend and saturate its LNA. If the receiver design does not consider such coexistence interference, the LNA may not be adapted at all and keep saturated until the coexistence interference be removed (e.g. by turning off the interference source).

Various in-device coexistence (IDC) interference mitigation solutions have been proposed. For example, an UE may request network assistance to mitigate IDC interference via frequency division multiplexing (FDM), time division multiplexing (TDM), and/or power management principles. However, network resources will be substantially consumed if many UEs request network assistance on IDC interference mitigation. Moreover, network efficiency will be degraded if all UEs request IDC assistance. Additional solutions are sought to reduce overhead and to improve efficiency for IDC interference mitigation.

SUMMARY

A method to trigger in-device coexistence (IDC) interference mitigation is provided. A wireless device comprises a first radio module and a co-located second radio module. The first radio module measures a received radio signal strength or quality based on a plurality of sampling instances. A control entity within the device obtains Tx/Rx activity of the second radio module and informs Tx/Rx timing information to the first radio module. The first radio module determines a measurement result based on the obtained timing information. The first radio module triggers an IDC interference mitigation mechanism if the measurement result satisfies a configurable condition. The IDC triggering mechanism prevents unnecessary and arbitrary IDC request from the device and thus improves network efficiency.

In one embodiment, the first radio module is an LTE/WiMAX radio, and the second radio module is a WiFi/BT radio. In one example, the IDC interference mitigation mechanism is to deactivate the WiFi/BT radio when the LTE/WiMAX radio is receiving desired radio signals, or vice versa. In another example, the LTE/WiMAX radio reports IDC interference information and traffic pattern information of the WiFi/BT radio module to a base station for network-assisted coexistence interference mitigation. The base station then applies various FDM or TDM solutions accordingly to mitigate interference. The condition (e.g., a threshold value) for triggering IDC interference mitigation is configurable by the base station. The base station may configure different thresholds for different scenarios. Moreover, different conditions may be applied to trigger different IDC interference mitigation mechanisms under different scenarios.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 3:
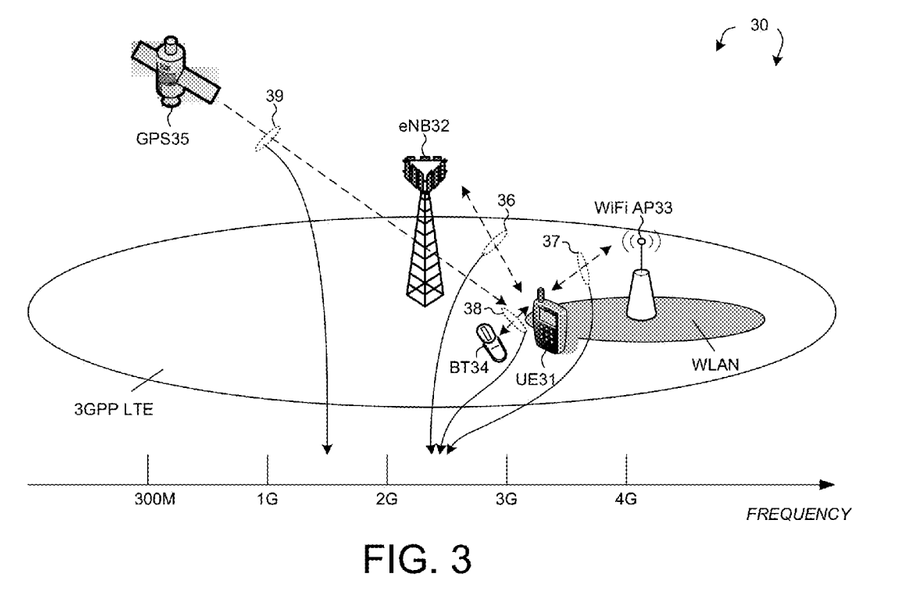
FIG. 3 illustrates a user equipment having multiple radio transceivers in a wireless communication system in accordance with one novel aspect.

FIG. 3 illustrates a user equipment UE31 having multiple radio transceivers in a wireless communication system 30 in accordance with one novel aspect. Wireless communication system 30 comprises a user equipment UE31, a serving base station (e.g., evolved node-B) eNB32, a WiFi access point WiFi AP33, a Bluetooth device BT34, and a global positioning system satellite device GPS35. Wireless communication system 30 provides various network access services for UE31 via different radio access technologies. For example, eNB32 provides OFDMA-based cellular radio network (e.g., a 3GPP Long-Term Evolution (LTE) or LTE-Advanced (LTE-A) system) access, WiFi AP33 provides local coverage in Wireless Local Area Network (WLAN) access, BT34 provides short-range personal network communication, and GPS35 provides global access as part of a Global Navigation Satellite System (GNSS). To access various radio networks, UE31 is a multi-radio terminal (MRT) that is equipped with multiple radios coexisted/co-located in the same device platform (i.e., in-device).

Due to spectrum regulation, different radio access technologies may operate in overlapping or adjacent radio spectrums. As illustrated in FIG. 3, UE31 communicates radio signal 36 with eNB32, radio signal 37 with WiFi AP33, radio signal 38 with BT34, and receives radio signal 39 from GPS35. Radio signal 36 belongs to 3GPP Band 40, radio signal 37 belongs to one of the WiFi channels, and radio signal 38 belongs to one of the seventy-nine Bluetooth channels. The frequencies of all those radio signals fall within a range from 2.3 GHz to 2.5 GHz, which may result in significant in-device coexistence (IDC) interference to each other. The problem is more severe around the 2.4 GHz ISM (The Industrial, Scientific and Medical) radio frequency band. In one novel aspect, UE31 triggers IDC interference mitigation mechanism based on accurate and effective IDC interference measurement result.

Figure 4:
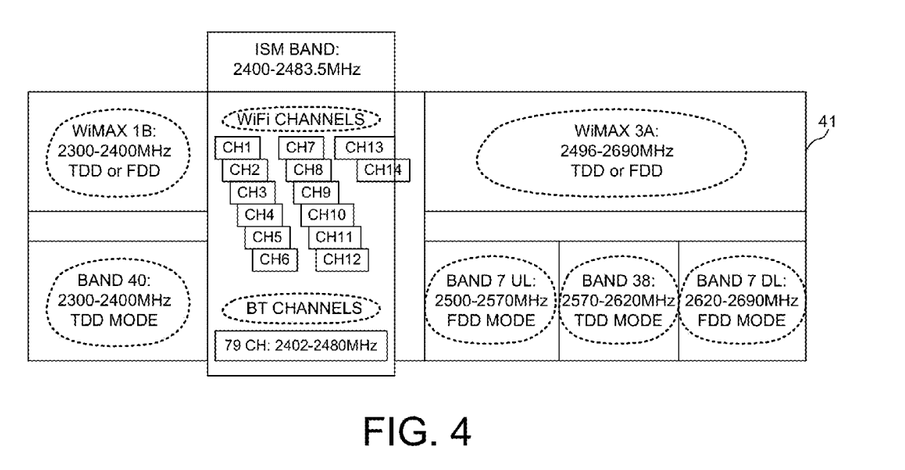
FIG. 4 illustrates a global spectrum allocation around 2.4 GHz ISM band in more detail.

FIG. 4 illustrates a global spectrum allocation around the 2.4 GHz ISM band in more detail and the corresponding coexistence interference impact from WiFi to LTE in 3GPP Band 40. As illustrated by the top table 41 of FIG. 4, the 2.4 GHz ISM band (e.g., ranges from 2400-2483.5 MHz) is used by both fourteen WiFi channels and seventy-nine Bluetooth channels. The WiFi channel usage depends on WiFi AP decision, while Bluetooth utilizes frequency hopping across the ISM band. In addition to the crowded ISM band, WiMAX 1B or 3GPP Band 40 ranges from 2300-2400 MHz, and WiMAX 3A or 3GPP Band 7 UL ranges from 2500-2570 MHz, both are very close to the 2.4 GHz ISM radio frequency band. As a result, without additional interference avoidance mechanism, traditional filtering solution is insufficient to mitigate IDC interference such that different radio access technologies can work well independently on the same device platform. Different solutions have been sought to avoid the coexistence interference.

Figure 5:
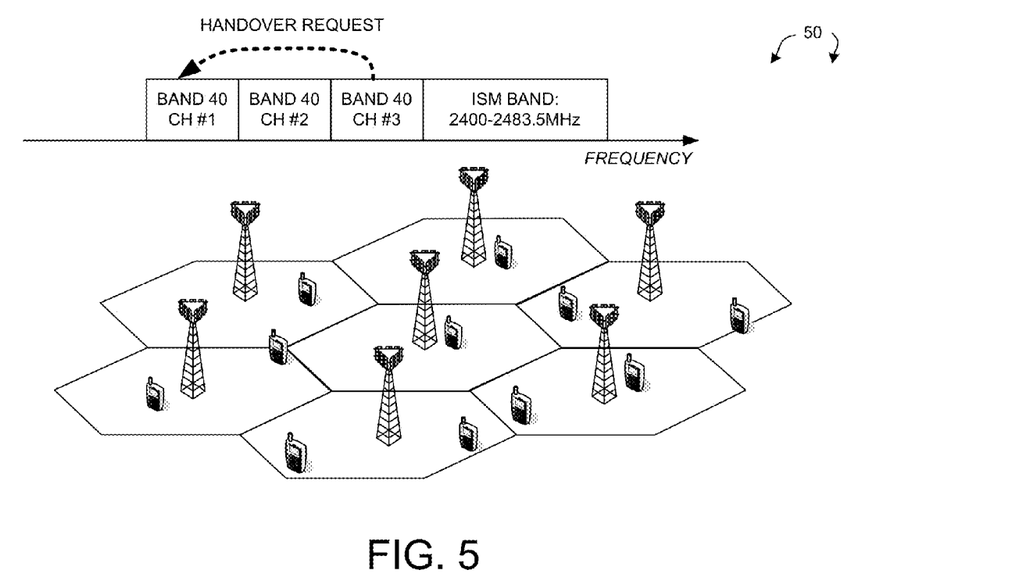
FIG. 5 illustrates one example of FDM solution for IDC interference avoidance.

FIG. 5 illustrates one example of frequency division multiplexing (FDM) solution for IDC interference avoidance in wireless network 50. Wireless network 50 comprises a plurality of eNBs and a plurality of UEs. For cellular network access, the UEs are served by their serving eNBs via different frequency channels (e.g., CH#1-CH#3) in 3GPP Band 40. The UEs are also equipped with in-device WiFi transceivers for WLAN access or BT transceivers for personal network communication (not shown). When an UE experiences IDC interference, it is likely for the UE to request handover from CH#3 (e.g., closer to the ISM band) to CH#1 (e.g., farther away from the ISM band). However, load unbalance may result by too many UEs making the same handover request. In addition, some UEs may arbitrary request handover based on reporting fake IDC problem. It is thus proposed that an UE triggers FDM solution based on accurate IDC interference measurement result.

Figure 6:
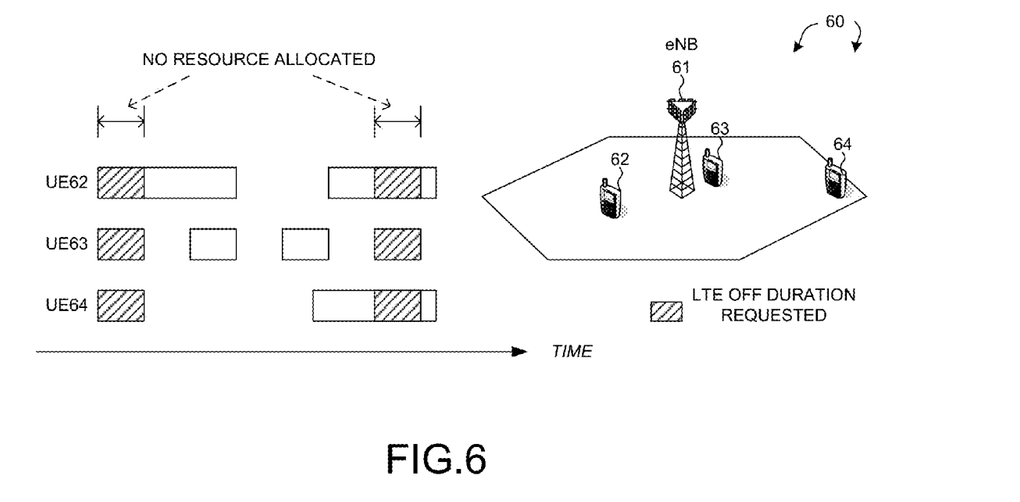
FIG. 6 illustrates one example of TDM solution for IDC interference avoidance.

FIG. 6 illustrates one example of time division multiplexing (TDM) solution for IDC interference avoidance in wireless network 60. Wireless network 60 comprises an eNB61 and UE62-64 served by eNB61. In the example of FIG. 6, UE62-64 may request certain LTE off duration (e.g., depicted by slashed shade) for resource allocation to avoid IDC interference. Because the timing requirement in each UE is independent (e.g., the requested LTE off durations may be the same from each UE), it is difficult for eNB61 to efficiently schedule and allocate radio resource. User throughput may also be degraded when TDM solution is activated. It is thus proposed that an UE triggers TDM solution based on accurate IDC interference measurement result.

Figure 7:
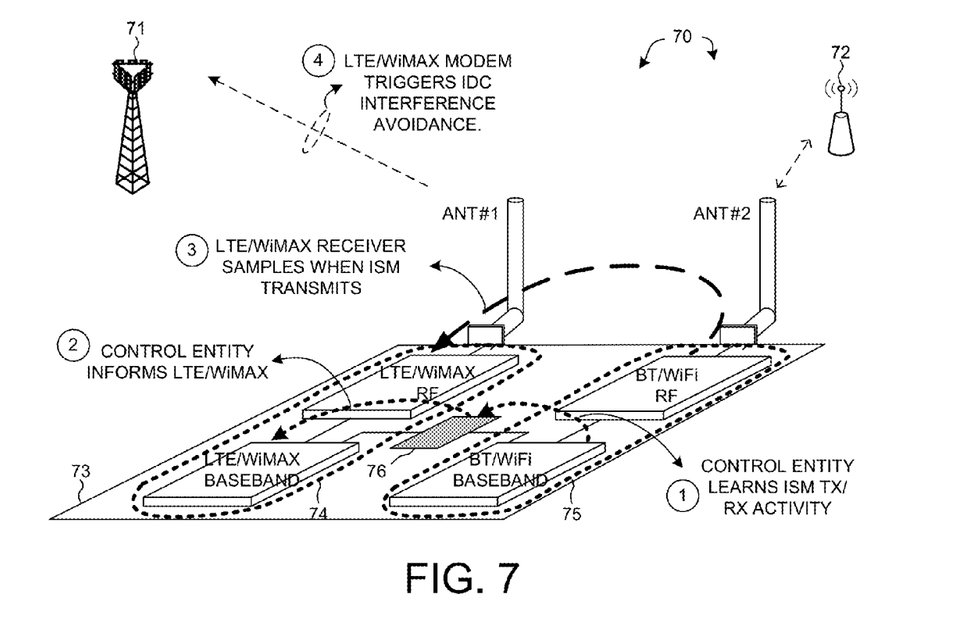
FIG. 7 illustrates a method of triggering IDC interference mitigation solution in accordance with one novel aspect.

FIG. 7 illustrates a method of triggering IDC interference mitigation solution in wireless network 70 in accordance with one novel aspect. Wireless network 70 comprises an eNB71, a WiFi AP72, and an UE73. UE73 comprises an LTE/WiMAX radio module (e.g., transceiver) 74, an ISM BT/WiFi radio module (e.g., transceiver) 75, and a control entity 76. In one novel aspect, control entity 76 learns ISM Tx/Rx activity from BT/WiFi transceiver 75 (step 1) and informs the ISM Tx/Rx timing information to LTE/WiMAX transceiver 74 (step 2). Based on the ISM Tx/Rx timing information, LTE/WiMAX radio module 74 measures IDC interference (step 3) and triggers IDC interference avoidance mechanism if certain conditions are satisfied (step 4). In addition, LTE/WiMAX radio module 74 reports ISM traffic and scheduling information to eNB71 to assist IDC configuration.

Figure 8:
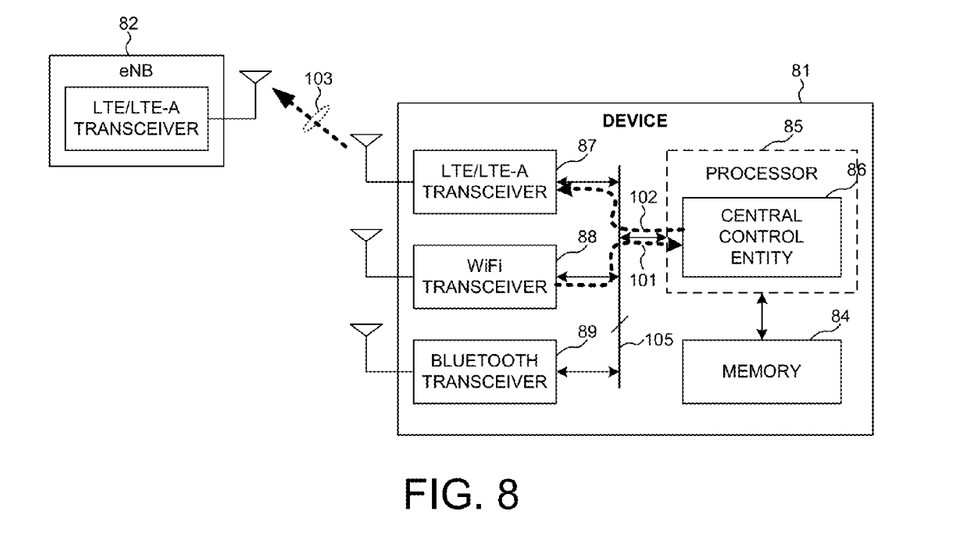
FIG. 8 is a simplified block diagram of an LTE user equipment having a central control entity.

FIG. 8 is a simplified block diagram of a wireless device 81 having a central control entity. Wireless device 81 comprises memory 84, a processor 85 having a central control entity 86, a LTE/LTE-A transceiver 87, a WiFi transceiver 88, a Bluetooth transceiver 89, and bus 105. In the example of FIG. 8, central control entity 86 is a logical entity physically implemented within processor 85, which is also used for device application processing for device 81. Alternatively, central control entity 86 is a logical entity implemented within a processor that is physically located within the LTE/WiMAX transceiver, the WiFi transceiver, or the BT transceiver. Central control entity 86 is connected to various transceivers within device 81, and communicates with the various transceivers via bus 105. For example, WiFi transceiver 88 transmits WiFi signal information and/or WiFi traffic and scheduling information to central control entity 86 (e.g., depicted by a dotted line 101). Based on the received WiFi information, central control entity 86 informs WiFi Tx/Rx timing information to LTE/LTE-A transceiver 87 (e.g., depicted by a dotted line 102). In one embodiment, the LTE radio module measures the received radio signal strength or quality and calculates measurement result for IDC interference based on the WiFi Tx/Rx timing information. If the measurement result satisfies a certain condition, then the LTE radio module further communicates with its serving base station eNB82 to trigger various coexistence interference mitigation mechanisms (e.g., depicted by a dotted line 103).

There are many different interference mitigation mechanisms. Some mechanisms only require UE internal coordination, such as deactivate the transmission of one radio module when the other co-located radio module is receiving desired radio signals. On the other hand, some mechanisms require network assistance, such as an UE sending an indication to a base station to trigger network-assisted solution. Via the indication, the UE may request changing its serving frequency to be farther away from the frequency location of the coexistence ISM interference signal (e.g., FDM solution). Via the indication, the UE may also request reserving certain time slots not to be scheduled for data transmission or reception (e.g., TDM solution).

Figure 9:
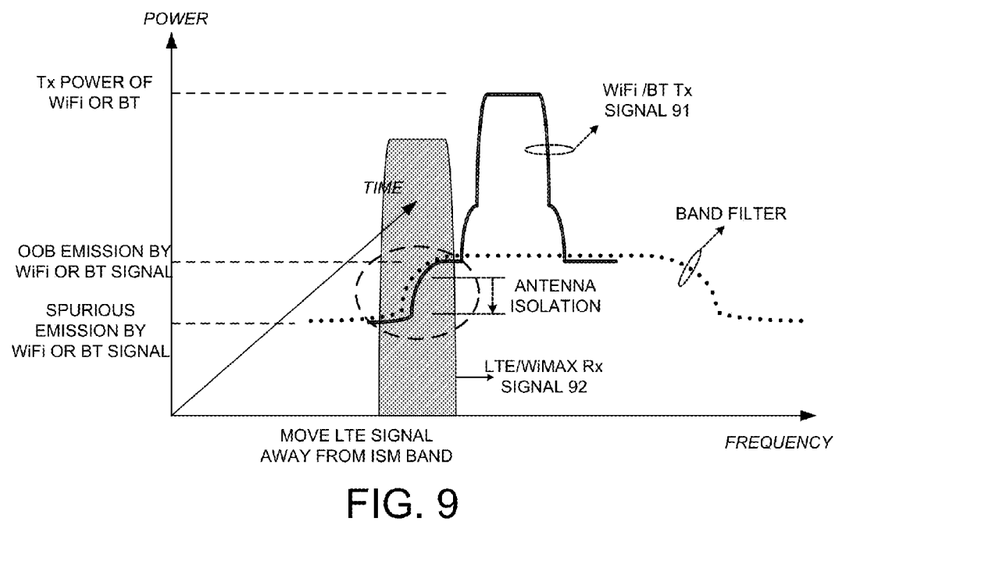
FIG. 9 illustrates one embodiment of triggering IDC interference mitigation.

FIG. 9 illustrates one embodiment of triggering ISM radio activation or deactivation based on measurement to cellular system. In the example of FIG. 9, an LTE/WiMAX transceiver is co-located with a WiFi/BT transceiver in a wireless device. The transmit (Tx) signal by the WiFi/BT transceiver (e.g., WiFi/BT Tx signal 91) is very close to the receive (Rx) signal for the LTE/WiMAX transceiver (e.g., LTE/WiMAX RX signal 92) in frequency domain. As a result, the out of band (OOB) emission and spurious emission by the WiFi/BT transceiver is relatively high to the LTE/WiMAX transceiver resulted by imperfect TX filter and RF design. However, if the LTE/WiMAX Rx signal power is higher than certain level, then the IDC interference can be ignored even in worst case (e.g., with shortest frequency separation between LTE/WiMAX and WiFi/BT, under given filter performance). For example, as long as the LTE/WiMAX Rx signal power is higher than the maximum coexistence interference level that may possibly happen under the given filter performance and the known frequency separation, the wireless device does not need to deactivate its ISM radio at all. The same concept can be used to trigger ISM radio activation. For example, if the LTE/WiMAX Rx signal power is higher than the aforementioned threshold, then the wireless device can freely activate its ISM radio.

In general, the novel IDC triggering mechanism relies on radio signal measurement result and a corresponding condition (e.g., a threshold value) to determine whether any IDC interference avoidance solution needs to be triggered. In another word, an IDC interference avoidance solution is triggered only if the measurement result satisfies a certain condition. Such IDC triggering mechanism prevents unnecessary and arbitrary IDC request from the UEs and thus improves network efficiency. The radio signal measurement to cellular system may include received signal strength (e.g., RSRP in LTE, or RSSI in WiMAX), received signal quality (e.g., RSRQ in LTE, or CINR in WiMAX), received interference power level, or channel quality indicator (CQI). The triggering condition may be in the form of the original measurement such as RSRP/RSRQ, or CQI. The triggering condition may be further derived based on the original measurement, such as in the form of effective throughput (e.g., a function of CQI), latency or block error rate (BLER) base on the aforementioned measurement results. An LTE/WIMAX device can activate its ISM radios if the measurement result is better than a threshold. On the other hand, the LTE/WiMAX device needs to de-activate its ISM radio or activate addition IDC interference mitigation mechanism if the measurement result is worse than the threshold.

The condition for triggering IDC is not necessarily a fixed condition, but configurable instead. For example, a threshold may be configured by the base station and stored in the mobile stations. The configuration parameters can be carried by radio resource control (RRC) signaling, media access control (MAC) control element (CE), or capability negotiation signaling in LTE systems. In another example, the threshold may be pre-defined and stored in the mobile stations. The base station may configure different thresholds for different scenarios. For example, different in-device ISM radios (e.g., WiFi or BT), different ISM operation modes (e.g., WiFi AP mode, BT connection setup, paging, scanning), and different frequency separation from ISM radio signals may be considered by the base station in determining the thresholds. Moreover, different conditions may be applied to activate different IDC interference mitigation mechanisms under different scenarios. For example, a first condition may only trigger UE internal coordination, while a second condition may further trigger UE reporting to eNB for network assistance. In addition, the derivation of the conditions/thresholds may be based on the worst-case deployment scenario such as the worst case of frequency separation (e.g., 40 MH between Band 40 and ISM band), or the worst case of filter performance (e.g., filters just meet RF emission mask).

Figure 10:
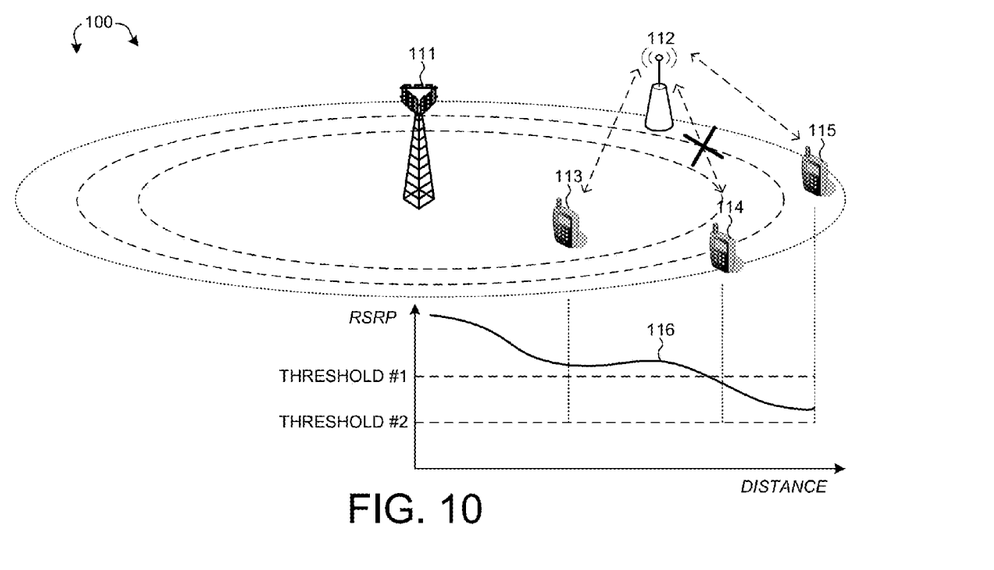
FIG. 10 illustrates another embodiment of triggering IDC interference mitigation.

FIG. 10 illustrates another embodiment of triggering IDC interference mitigation in wireless network 100 using different thresholds. Wireless network 100 comprises an eNB111, a WiFi AP112, and UE113-UE115. UE113 and UE114 are not capable to mitigate IDC interference without network assistance (referred to as coexistence-non-capable), while UE115 has implemented such capability (referred to as coexistence-capable). In the example of FIG. 10, a threshold of the RSRP measurement of LTE radio signal is applied for each UE to report to eNB111. In general, the threshold for coexistence-capable UE115 can be lower than the threshold for coexistence-non-capable UE113 and UE114 because of the IDC interference mitigation capability. The RSRP measurement of each UE varies with the location of the UE. As depicted by curve 116 in FIG. 10, the RSRP gradually drops when the UE moves away from the serving eNB111. A higher threshold #1 is applied for coexistence-non-capable UE113 and UE114, while a lower threshold #2 is applied for coexistence-capable UE115. Because the RSRP measurement for UE113 is higher than threshold #1, UE113 will not report IDC interference information to eNB111. On the other hand, because the RSRP measurement for UE114 is lower than threshold #1, UE114 will report IDC interference information to eNB111 and trigger coexistence interference mitigation mechanisms. For UE115, because the RSRP measurement is lower than threshold #1 but higher than threshold #2, UE115 will not report IDC interference information to eNB111 because UE115 is capable to mitigate some of the IDC interference without network assistance. It is noted that although RSRP is used for illustration, CQI measurement is also applicable in the example of FIG. 10.

Because the IDC triggering solution relies on IDC interference measurement result, it is thus critical to be able to obtain accurate measurement result that efficiently detects coexistence interference. Device coordination capability is required to support accurate measurement result. From LTE/WiMAX perspective, the LTE/WiMAX transceiver first needs to know (e.g., via an internal controller) whether other in-device transceiver(s) is transmitting or receiving within limited time latency. More specifically, the LTE/WiMAX transceiver needs to know the time duration when the LTE/WiMAX transceiver can measure the coexistence interference due to WiFi/BT transmission, the time duration when LTE/WiMAX could receive without coexistence interference from the WiFi/BT transceivers. Based on that knowledge, the LTE/WiMAX transceiver can measure coexistence interference and evaluate which frequencies may or may not be seriously interfered (e.g., unusable frequencies) for LTE/WiMAX RX. If coexistence interference is higher than a threshold, the LTE/WiMAX transceiver will then indicate the unusable frequencies to the eNB based on the measurement result for triggering IDC interference mitigation.

In LTE systems, reference signal received power (RSRP) and reference signal received quality (RSRQ) are commonly measured by the UE to represent radio signal strength, quality, and interference level. RSRP is defined as the linear average over the power contributions of the resource elements that carry cell-specific reference signals within considered measurement frequency bandwidth. The number of resource elements within the considered measurement frequency bandwidth and within the measurement period that are used by the UE to determine RSRP, however, is left up to the UE implementation with the limitation that corresponding measurement accuracy requirements have to be fulfilled.

Figure 11:
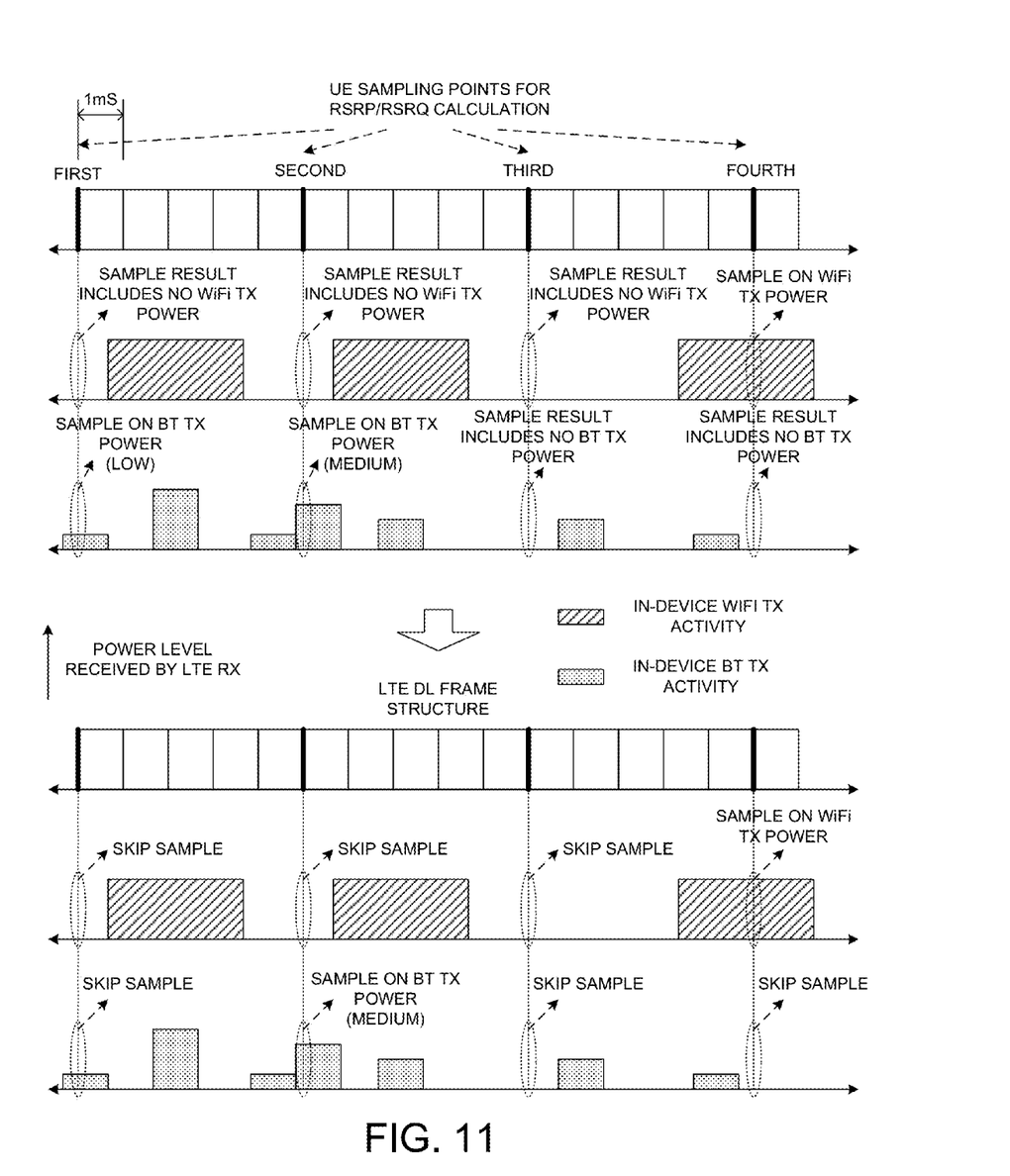
FIG. 11 illustrates an example of IDC interference measurement in accordance with one novel aspect.

FIG. 11 illustrates an example of IDC interference measurement in accordance with one novel aspect. The top half of FIG. 11 illustrates that the UE normally samples the received reference signal power level consecutively (i.e., every five subframes (5 ms)) and take the average with certain weighting. However, interfering signals from WiFi/BT may not be transmitted by the WiFi/BT radios when the UE is sampling for LTE measurement (e.g., due to bursty WiFi traffic). In addition, interfering signal power level may be time variant (e.g., due to BT frequency hopping). In the example of FIG. 11, for WiFi interfering signals, there is no WiFi Tx activity at the first three sampling points. Similarly, for BT interfering signals, there is no BT Tx activity at the third and the fourth sampling points, and there is only low BT Tx power at the first sampling point. If the UE uses all four sampling points and takes the average in calculating the RSRP/RSRQ measurement result, such RSRP/RSRQ measurement result will be very unreliable, and cannot detect coexistence interference effectively.

The bottom half of FIG. 11 illustrates a novel mechanism of determining the RSRP/RSRQ measurement result based on the transmission activity of the in-device WiFi/BT radios. If the LTE/WiMAX radio knows the timing information of the WiFi/BT Tx activity, then the LTE/WiMAX radio can use the timing information in calculating the RSRP/RSRQ measurement result. In the example of FIG. 11, the UE still measures the received reference signal power level at four consecutive sampling points, but then skips certain sampling points in calculating the measurement result. For example, if the co-located radio is WiFi, then the UE skips the first three sampling points (because they include no WiFi Tx power) in calculating the RSRP measurement result. If the co-located radio is BT, then the UE skips the first, the third, and the fourth sample points (because they include no or low BT TX power) in calculating the RSRP measurement result. Alternatively, the UE may even skip measuring the RSRP at those time instances when WiFi/BT radios are not transmitting interfering signals. By skipping the sampling points for measurement/calculation when there is no interfering signal, the measurement result is more reliable in detecting coexistence interference.

Once the UE calculates that the measurement result (e.g., the RSRP or interference level) is lower or higher than a configured threshold value, then the UE triggers IDC interference mitigation mechanism. In LTE systems, most UE activities including DRX configuration and handover procedures are controlled by the network. Therefore, the UE reports IDC interference indication to its serving eNB and in response the eNB helps to trigger IDC interference mitigation mechanism. For example, the UE may report to the eNB the frequency channels that are affected, or indicate to the eNB for handover operation. In one novel aspect, the UE also transmits special ISM traffic pattern of the in-device WiFi/BT radios to its serving eNB, which triggers the eNB scheduler to configure DRX/DTX to avoid interference in time domain.

Figure 12:
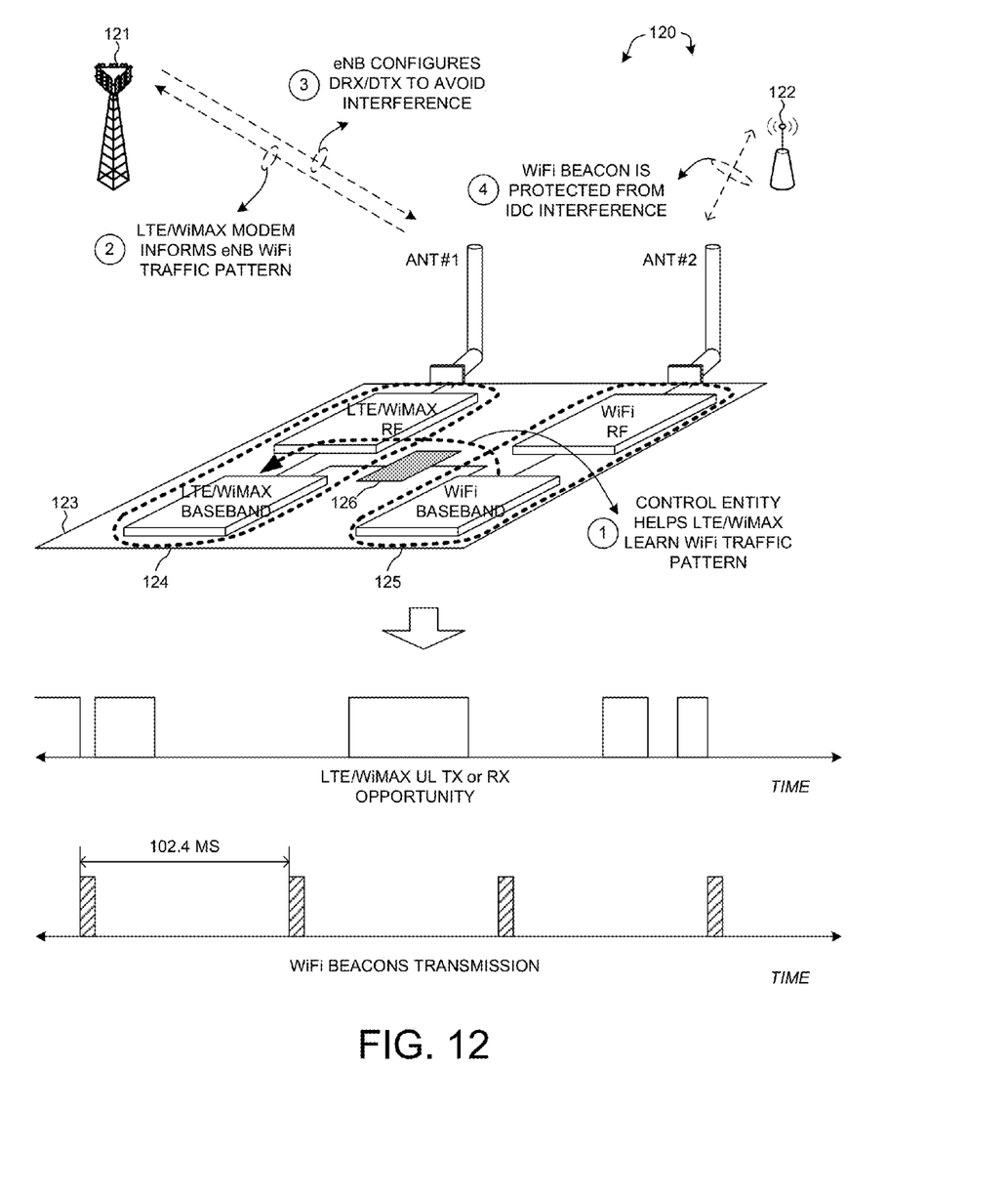
FIG. 12 illustrates an example of reporting traffic and scheduling information in accordance with one novel aspect.

FIG. 12 illustrates an example of reporting traffic and scheduling information in wireless network 120 in accordance with one novel aspect. Wireless network 120 comprises a base station eNB121, a WiFi AP122, and an UE123. UE123 comprises an LTE/WiMAX transceiver 124, a WiFi transceiver 125, and a control entity 126. First, the control entity helps the LTE/WiMAX transceiver to learn the WiFi traffic pattern (step 1). Once UE123 determines to trigger IDC interference mitigation mechanism based on measurement result, LTE/WiMAX transceiver 124 reports the WiFi traffic pattern to eNB121 (step 2). Based on the WiFi traffic pattern, eNB121 is then able to schedule DRX/DTX configuration to avoid interference (step 3). As illustrated in FIG. 12, eNB121 schedules LTE/WiMAX UL Tx or Rx opportunity to avoid interference with WiFi beacon transmission in time domain. The scheduling may include onDurationTimer, drx-InactivityTimer, drx-RetransmissionTimer, longDRX-Cycle, the value of the drxStartOffset, the drxShortCycleTimer, shortDRX-Cycle or starting time. As a result, the WiFi beacons are protected from IDC interference (step 4).

Typically, for WiFi traffic, the traffic pattern information may include indication for WiFi beacon Tx/Rx time information, the periodicity, variation, and/or start time of a bursty traffic (e.g., every 100 ms with variation <1 ms, and start from 3 subframes after). For Bluetooth traffic, the traffic pattern information may include operation mode (e.g., eSCO, A2DP), periodicity, and required Tx/Rx slot number. The indication can also be an index that is associated with a pre-defined traffic pattern. For example, index=0 is associated with WiFi beacon, index=1 is associated with eSCO, and index=2 is associated with A2DP. Such indication is suitable to support ISM radios with pre-defined traffic patterns. Although the eNB may not always avoid collision, but it will schedule LTE traffic in best effort manner. From UE perspective, it may stop LTE Tx autonomously to avoid interference.

Figure 13:
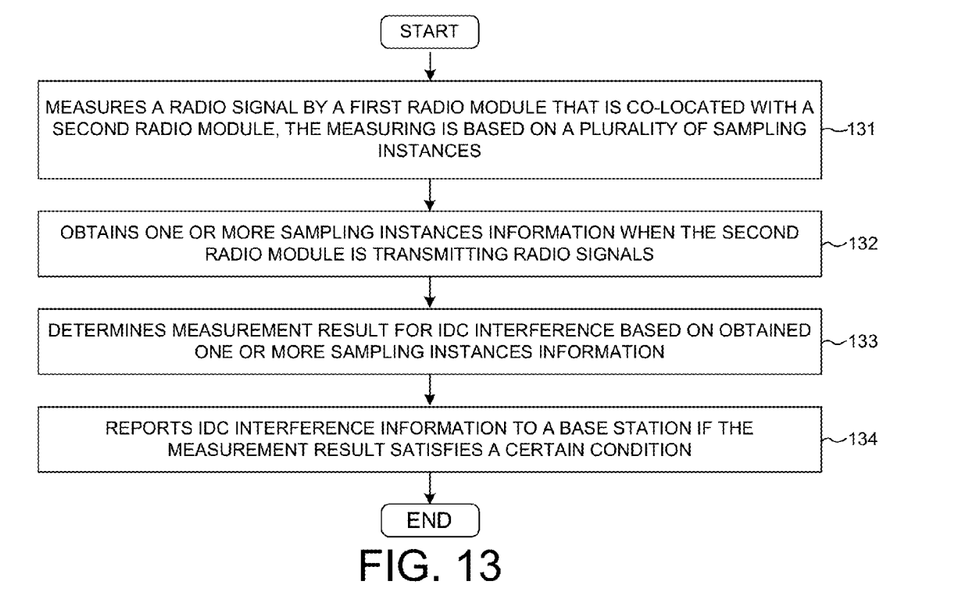
FIG. 13 is a flow chart of a method of triggering IDC interference mitigation.

FIG. 13 is a flow chart of a method of triggering IDC interference mitigation. In step 131, a first radio module of a wireless device measures a received reference signal. The first radio module is co-located with a second radio module, and the measurement is based on a plurality of sampling instances. For example, the measurement is performed every 5 ms consecutively. In step 132, the first radio module obtains one or more sampling instances, and during those sampling instances, the second radio module is transmitting radio signals. In step 133, the first radio module uses the obtained sampling instances information to calculate radio signal measurement result. In step 134, the device triggers IDC interference mitigation mechanism if the measurement result satisfies a certain condition. For example, the first radio module reports interference information to a base station for network-assisted interference mitigation solution. The condition may be a threshold value of the measurement result for the received radio signal. The threshold is configurable when applied in different scenarios.

Figure 14:
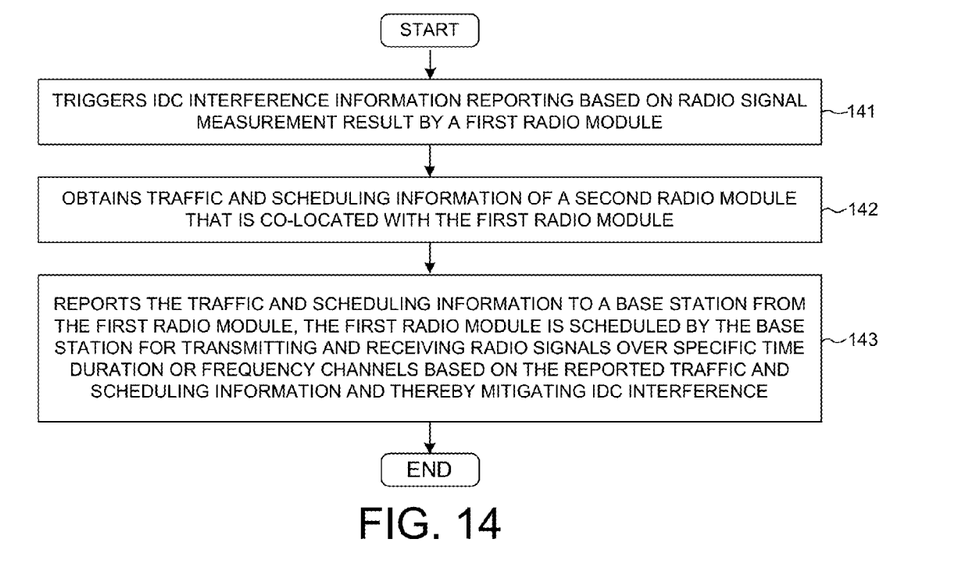
FIG. 14 is a flow chart of a method of reporting traffic and scheduling information for IDC interference mitigation.

FIG. 14 is a flow chart of a method of reporting traffic and scheduling information for IDC mitigation. In step 141, a first radio module of a wireless device reports IDC interference information to a base station based on radio signal measurement result. In step 142, the first radio module obtains traffic and scheduling information of a second radio module that is co-located with the first radio module. In step 143, the first radio module reports the traffic and scheduling information to the base station. In response to the reported traffic and scheduling information, the first radio module is scheduled by the base station for transmitting and receiving radio signals over specific time duration or frequency channels and thereby mitigating IDC interference.

Although the present invention has been described in connection with certain specific embodiments for instructional purposes, the present invention is not limited thereto. For example, although an LTE-advanced or WiMAX mobile communication system is exemplified to describe the present invention, the present invention can be similarly applied to other mobile communication systems, such as Time Division Synchronous Code Division Multiple Access (TD-SCDMA) systems. Accordingly, various modifications, adaptations, and combinations of various features of the described embodiments can be practiced without departing from the scope of the invention as set forth in the claims.

What is claimed is:

1. A method comprising:
   (a) measuring a received first radio signal by a first radio module that is co-located with a second radio module in a user equipment (UE), wherein the measuring is based on a plurality of consecutive sampling instances during a measurement interval, and wherein the sampling instances include at least one interfering sampling instance and one non-interfering sampling instance separated by a predefined number of subframes of the first radio signal;
   (b) obtaining one or more interfering sampling instances from the plurality of consecutive sampling instances by skipping the remaining non-interfering sampling instances when the second radio module is not transmitting radio signals;
   (c) determining a measurement result for in-device coexistence (IDC) interference based on the obtained one or more interfering sampling instances and excluding the remaining non-interfering sample instances of the same measurement interval; and
   (d) triggering an IDC interference mitigation mechanism if the measurement result satisfies a condition.

2. The method of claim 1, wherein the one or more interfering sampling instances is obtained through a control entity that communicates with both the first and the second radio modules.

3. The method of claim 1, wherein the condition is configurable by a base station, and wherein the UE receives the condition information via a signaling message.

4. The method of claim 1, wherein the condition is predefined and stored in the UE.

5. The method of claim 1, further comprising:
   (e) obtaining traffic and scheduling information of the second radio module; and
   (f) reporting the traffic and scheduling information to a base station if the IDC interference mitigation mechanism is triggered.

6. The method of claim 1, wherein the first radio module is an LTE radio module, and wherein the second radio module is a WiFi or Bluetooth radio module.

7. The method of claim 1, wherein the UE does not trigger IDC interference mitigation mechanism if the measurement result of a reference signal received power (RSRP) or channel quality indicator (CQI) satisfies a second condition.

8. The method of claim 1, wherein the IDC interference mitigation mechanism includes deactivate the transmission of the second radio when the first radio is receiving desired radio signals.

9. The method of claim 1, wherein the IDC interference mitigation mechanism includes sending an indication to a base station to request changing a serving frequency of the first radio module farther away from a frequency location of an interference signal transmitted by the second radio module.

10. The method of claim 1, wherein the IDC interference mitigation mechanism includes sending an indication to a base station to request reserving a number of time slots not to schedule data transmission or reception by the first radio module.

11. The method of claim 1, wherein the IDC interference mitigation mechanism includes adapting an operation point of a low noise amplifier (LNA) to prevent saturation.

12. A wireless communication device, comprising:
   a first radio module that measures a first radio signal strength or quality, wherein the measuring is based on a plurality of consecutive sampling instances during a measurement interval, wherein the sampling instances include at least one interfering sampling instance and one non-interfering sampling instance separated by a predefined number of subframes of the first radio signal;
   a second radio module that is co-located with the first radio module; and
   a control entity that obtains one or more interfering sampling instances from the plurality of consecutive sampling instances by skipping the remaining non-interfering sampling instances when the second radio module is not transmitting radio signals,
   wherein the first radio module determines a measurement result for in-device coexistence (IDC) interference based on the obtained one or more interfering sampling instances and excluding the remaining non-interfering sample instances of the same measurement interval, and wherein the first radio module triggers an IDC interference mitigation mechanism if the measurement result satisfies a condition.

13. The device of claim 12, wherein the IDC interference mitigation mechanism involves reporting IDC interference information to a base station.

14. The device of claim 12, wherein the condition is configurable by a base station, and wherein the device receives the condition information via a signaling message.

15. The device of claim 12, wherein the condition is predefined and stored in the device.

16. The device of claim 12, wherein the device does not trigger the IDC interference mitigation mechanism if the measurement result of a reference signal received power (RSRP) or channel quality indicator (CQI) satisfies a second condition.

17. The device of claim 12, wherein the first radio module is an LTE radio module, and wherein the second radio module is a WiFi or Bluetooth ISM band radio module.

18. The device of claim 12, wherein the first radio module reports traffic and scheduling information of the second radio module to a base station if the IDC interference mitigation mechanism is triggered.

19. The device of claim 18, wherein the base station schedules the first radio module to transmit or receive radio signals over specific time duration or frequency channels based at least in part on the reported traffic and scheduling information.

20. The device of claim 18, wherein the traffic and scheduling information comprises an index associated with a predefined traffic pattern.

\* \* \* \* \*